United States Patent
Sundarababu et al.

(10) Patent No.: US 9,742,659 B2
(45) Date of Patent: Aug. 22, 2017

(54) MULTIPATH BANDWIDTH USAGE

(71) Applicant: DELL PRODUCTS L.P., Round Rock, TX (US)

(72) Inventors: Premnath Sundarababu, Chennai (IN); Purushothaman Ramalingam, Chennai (IN); Vinod Kannan A. S., Chennai (IN)

(73) Assignee: DELL PRODUCTS LP, Round Rock, TX (US)

( * ) Notice: Subject to any disclaimer, the term of this patent is extended or adjusted under 35 U.S.C. 154(b) by 235 days.

(21) Appl. No.: 14/608,096

(22) Filed: Jan. 28, 2015

(65) Prior Publication Data
US 2016/0218960 A1  Jul. 28, 2016

(51) Int. Cl.
| H04L 12/28 | (2006.01) |
| H04L 12/751 | (2013.01) |
| H04L 12/741 | (2013.01) |
| H04L 12/707 | (2013.01) |
| H04L 12/803 | (2013.01) |
| H04L 12/721 | (2013.01) |

(52) U.S. Cl.
CPC .............. *H04L 45/08* (2013.01); *H04L 45/24* (2013.01); *H04L 45/74* (2013.01); *H04L 45/38* (2013.01); *H04L 47/125* (2013.01)

(58) Field of Classification Search
None
See application file for complete search history.

(56) References Cited

U.S. PATENT DOCUMENTS

| 2005/0286487 A1* | 12/2005 | Chitrapu | H04L 45/24 370/351 |
| 2012/0331160 A1* | 12/2012 | Tremblay | H04L 29/08702 709/228 |
| 2013/0194963 A1* | 8/2013 | Hampel | H04L 45/24 370/254 |
| 2014/0362765 A1* | 12/2014 | Biswas | H04W 76/026 370/328 |

(Continued)

FOREIGN PATENT DOCUMENTS

SE   WO 2016027130 A1 *  2/2016  ............. H04L 47/41

OTHER PUBLICATIONS

Bonaventure, Olivier et al., "An overview of multipath TCP," ;login: 37(5) Oct. 2012 (7pgs).

(Continued)

*Primary Examiner* — Michael J Moore, Jr.
(74) *Attorney, Agent, or Firm* — North Weber & Baugh LLP

(57) ABSTRACT

Embodiments of the present invention include systems and methods for identifying a primary flow and its corresponding subflow(s) so that the subflow(s) may be routed to more efficiently use bandwidth between a source host and a destination host. In embodiments, a table correlates flows and their corresponding keys for Multipath TCP flows. When a new subflow is initiated between a source device and a destination device, the new flow can be identified as being a subflow of a primary flow using data in the table. Having identified the subflow and its corresponding primary flow, the new subflow may have an installed route path that differs from its primary flow, thereby improving the bandwidth usage.

20 Claims, 12 Drawing Sheets

(56) References Cited

U.S. PATENT DOCUMENTS

| | | | | |
|---|---|---|---|---|
| 2015/0350337 | A1* | 12/2015 | Biswas | H04L 67/142 |
| | | | | 709/228 |
| 2016/0142373 | A1* | 5/2016 | Ossipov | H04L 63/0236 |
| | | | | 713/171 |
| 2016/0212055 | A1* | 7/2016 | Agarwal | H04L 47/365 |
| 2016/0261722 | A1* | 9/2016 | Paasch | H04L 47/193 |
| 2016/0360557 | A1* | 12/2016 | Lavi | H04L 67/10 |

OTHER PUBLICATIONS

Curtis, Andrew R. et al., "DevoFlow: Scaling flow management for high-performance networks," SIGCOMM'11, Toronto, Ontario, Canada, Aug. 15-19, 2011 (12pgs).

Paasch, Christoph et al., "Acmqueue multipath TCP, Decoupled from IP, TCP is at last able to support multihomed hosts," ACM 1542-7730/14/0200, queue.acm.org, 2014 (12pgs).

Xu, Hong, "Tinyflow: breaking elephants down into mice in data center networks," IEEE, 978-1-4799-4894-9/14 (6pgs).

* cited by examiner

Connection Establishment

Establishment of a Subflow

| Flow 605 | 4-Tuple 610 | Key A 615 | Key B 620 |
|---|---|---|---|
| | 625 | 630 | 635 |
| Flow 1 | <SourceIP$_1$, DestIP$_1$, SourcePort$_1$, DestPort$_1$> | Key-1 | Key-2 |
| Flow 2 | <SourceIP$_2$, DestIP$_2$, SourcePort$_2$, DestPort$_2$> | Key-A | Key-B |
| ... | ... | ... | ... |

600

Database used by SDN Controller

FIGURE 6

MULTIPATH BANDWIDTH USAGE

A. TECHNICAL FIELD

The present invention relates to networking and networking devices, more particularly, to systems and methods for improve the exchange of information between information handling systems.

B. DESCRIPTION OF THE RELATED ART

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Host systems connected to distributed networks, such as the Internet, or within a data center environment are often connected by multiple paths. Having multiple paths, also sometimes referred to as multipathing, allows for redundancy and can also be used to improve data throughput. Today, multipathing may be done at Layer 3 (L3) of the Open Systems Interconnection model (OSI) with Equal Cost Multipath (ECMP) routing. In this case, load balancing across the paths is typically performed on flows by calculating a hash, which may be based on, for example, IP addresses and TCP/UDP port numbers of the packets. Each packet of a flow will follow the same path through the network, which prevents out-of-order delivery within a flow. When data traffic has many different flows, the traffic should be evenly spread across the various paths based on the hashing logic. But, when there are only a few flows, which is typically the case in large data e-science applications, even distribution is not guaranteed by the hashing.

It is also possible that some paths between the two hosts are congested, whereas alternate paths are underutilized. Multipath Transmission Control Protocol (MPTCP or MPTCP) is a relatively new approach towards efficient load balancing to solve this problem by creating subflows. Even more efficient use of network resources is possible if these multiple paths are programmed appropriately. In addition, the use of multiple subflow connections enhances the user experience, because it provides higher throughput and improved resilience against network failures. Multipath TCP allows a single data stream to be split across multiple paths.

To achieve multipathing through MPTCP, source host should change any one of the 4-tuple (source IP, destination IP, source Port, and destination Port) in order to differentiate a TCP subflow from the primary flow. However, this newly created subflow may or may not take a different path through the network.

Consider the flows depicted in FIG. 1. FIG. 1 depicts the problem of a subflow being routed onto the same path as the primary flow due to the ECMP hash algorithm. As shown in FIG. 1, because the ECMP hashing process does not identify the primary flow and subflows, it is possible for the subflow (arrow 2) to be routed onto the same route path as the primary flow (arrow 1). Thus, one cannot deterministically say that subflows and primary flow will take different paths in the network, as it depends on the ECMP hash algorithm used in the networking switches, which may lead to underutilization.

Another problem with the current MPTCP implementation is that in the MPTCP scenario, only host-to-host MPTCP capability is checked. However, the host is typically unaware of the number of ECMP paths that are available in the network between the hosts. Thus, the lack of this knowledge does not enable hosts to create the number of subflows that the network can efficiently support.

Accordingly, what is needed are systems and methods to achieve better efficiency from MPTCP by identifying primary flow and its subflows and ensuring theses flows are balanced over the different paths across the network

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIG. 6 depicts an example database or table that correlates flows with source and destination information and keys for a MPTCP flow according to embodiments of the present invention.

DETAILED DESCRIPTION OF THE PREFERRED EMBODIMENTS

Figure 1:
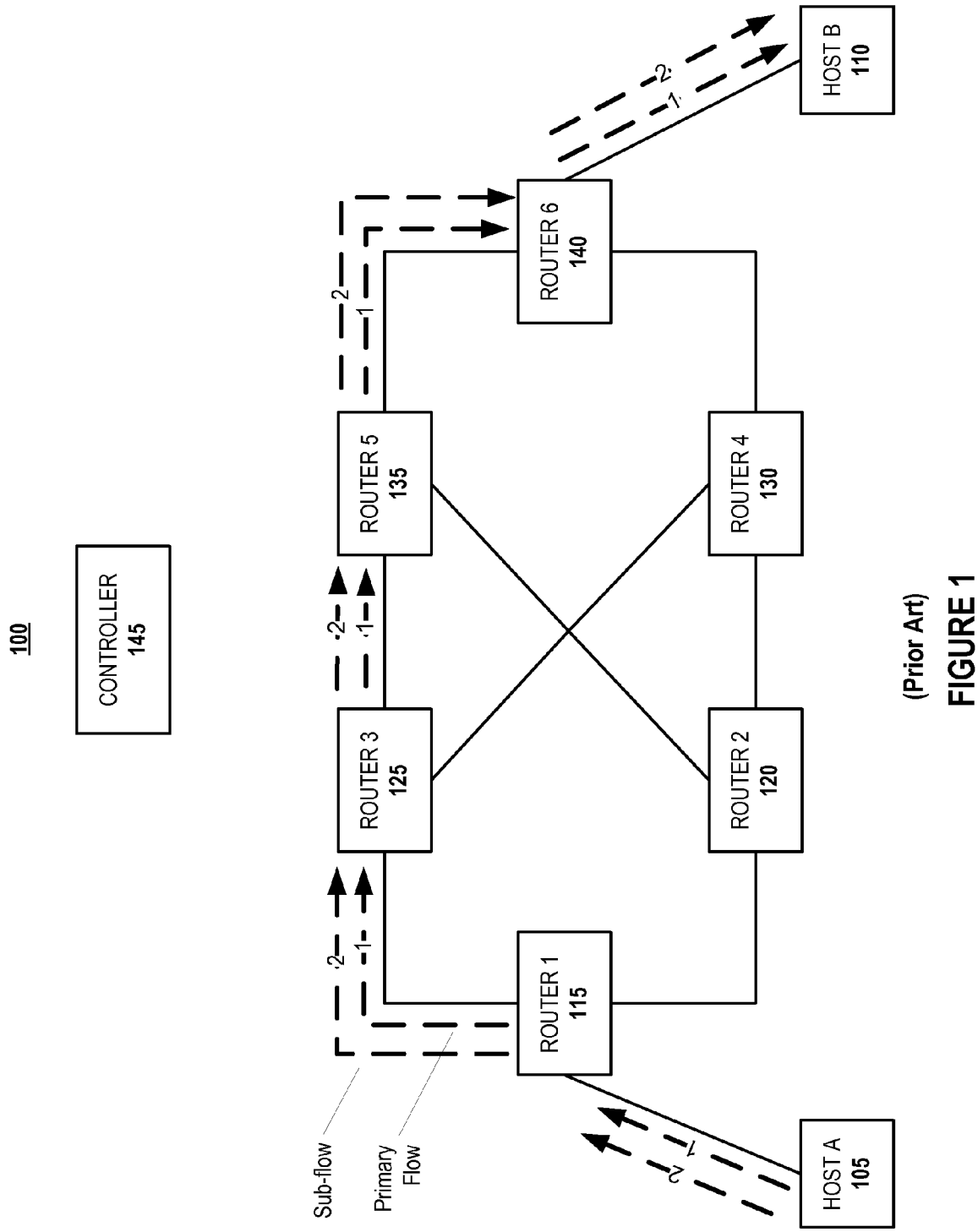
FIG. 1 depicts a problem of a subflow being routed onto the same path as the primary flow due to the Equal Cost Multipath hash algorithm.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or nodes. Components may be implemented in software, hardware, or a combination thereof.

Furthermore, connections between components, routers, switches, or nodes within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

The terms "packet," "datagram," "segment," or "frame" shall be understood to mean a group of bits that can be transported across a network. These terms shall not be interpreted as limiting embodiments of the present invention to particular layers (e.g., Layer 2 networks, Layer 3 networks, etc.); and, these terms along with similar terms such as "data," "data traffic," "information," "cell," etc. may be replaced by other terminologies referring to a group of bits, and may be used interchangeably.

Furthermore, it shall be noted that: (1) certain steps may optionally be performed; (2) steps may not be limited to the specific order set forth herein; and (3) certain steps may be performed in different orders, including being done contemporaneously.

A. Overview

Aspects of the present invention achieve improved benefits with MPTCP by identifying a primary flow and the associated subflow or subflows and ensure that, when possible, the subflows are routed onto different paths across the network.

In embodiments, to make the primary flow and its subflow(s) take different path in networking switches, the TCP 3-way handshake may be snooped for the MP_CAPABLE option in the SYN segment and the SYN+ACK reply, showing MPTCP as being supported by the hosts. This indicates the host is capable of sending, and may send, a MP_JOIN segment later to establish one or more subflows. Also, from the SYN and the SYN+ACK reply snooped packets, the primary flow details can be obtained to later identify the one or more subflows. In embodiments, this information may be stored in a database/table that is accessible by a software-defined networking (SDN) controller that performing route path generation/load balancing.

In embodiments, for identifying a subflow, a packet containing SYN/SYN+ACK with MP_JOIN may be snooped at an information handling device and correlated with the primary flow using the details previously obtained and stored in the database. In embodiments, having identified the subflow, a load balancer of a SDN controller may program this subflow to an alternate, unused path.

Thus, in embodiments, when an SDN controller receives snooped primary flow and subflow information, it can provide this information to a load balancer. In embodiments, the load balancer, which may be running in the SDN controller, takes the primary flow and subflow as input parameters and provides flow information for configuring the information handling devices (such as network switches, routers, or both). In embodiments, the SDN controller may install the routing information in the information handling devices via Open Flow protocol. In embodiments, flows are installed so that subflows take different ECMP paths, when possible.

Also, in embodiments, a software-defined networking (SDN) load balancer may calculate the number of unique paths available between the hosts. This information may be provided to the source host, the destination host, or both. Given this information, a host may create up to the corresponding number of subflows that the network can efficiently support.

B. Method Embodiments

Figure 2:
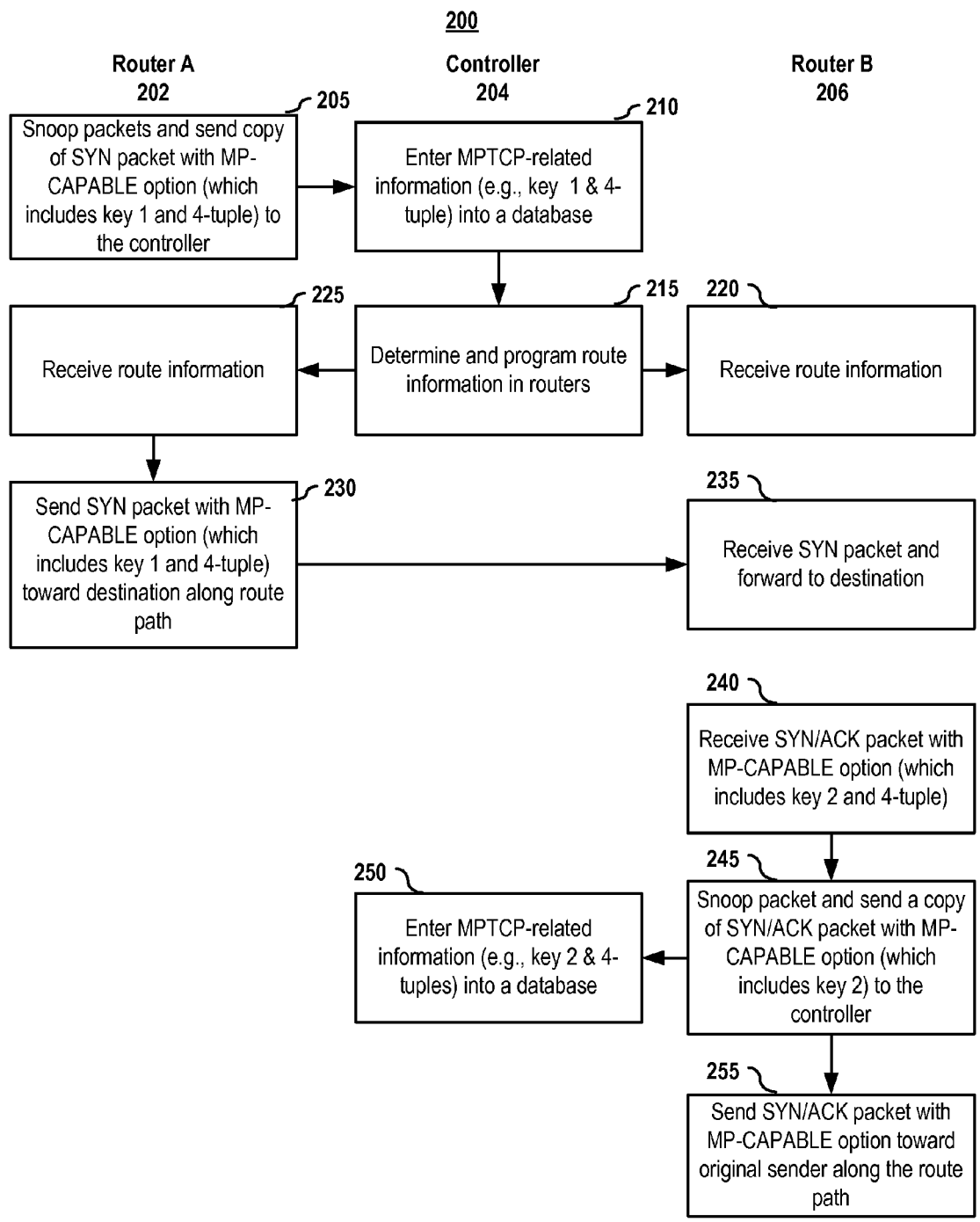
FIG. 2 depicts a methodology for a controller to generate a table of keys and source and destination information for a flow according to embodiments of the present invention.

FIG. 2 depicts a methodology for a controller to generate a table of keys and source and destination information for a flow according to embodiments of the present invention. In embodiments, the methodology of FIG. 2 utilizes knowledge of the MPTCP handshake process to obtain the necessary information.

Figure 3:
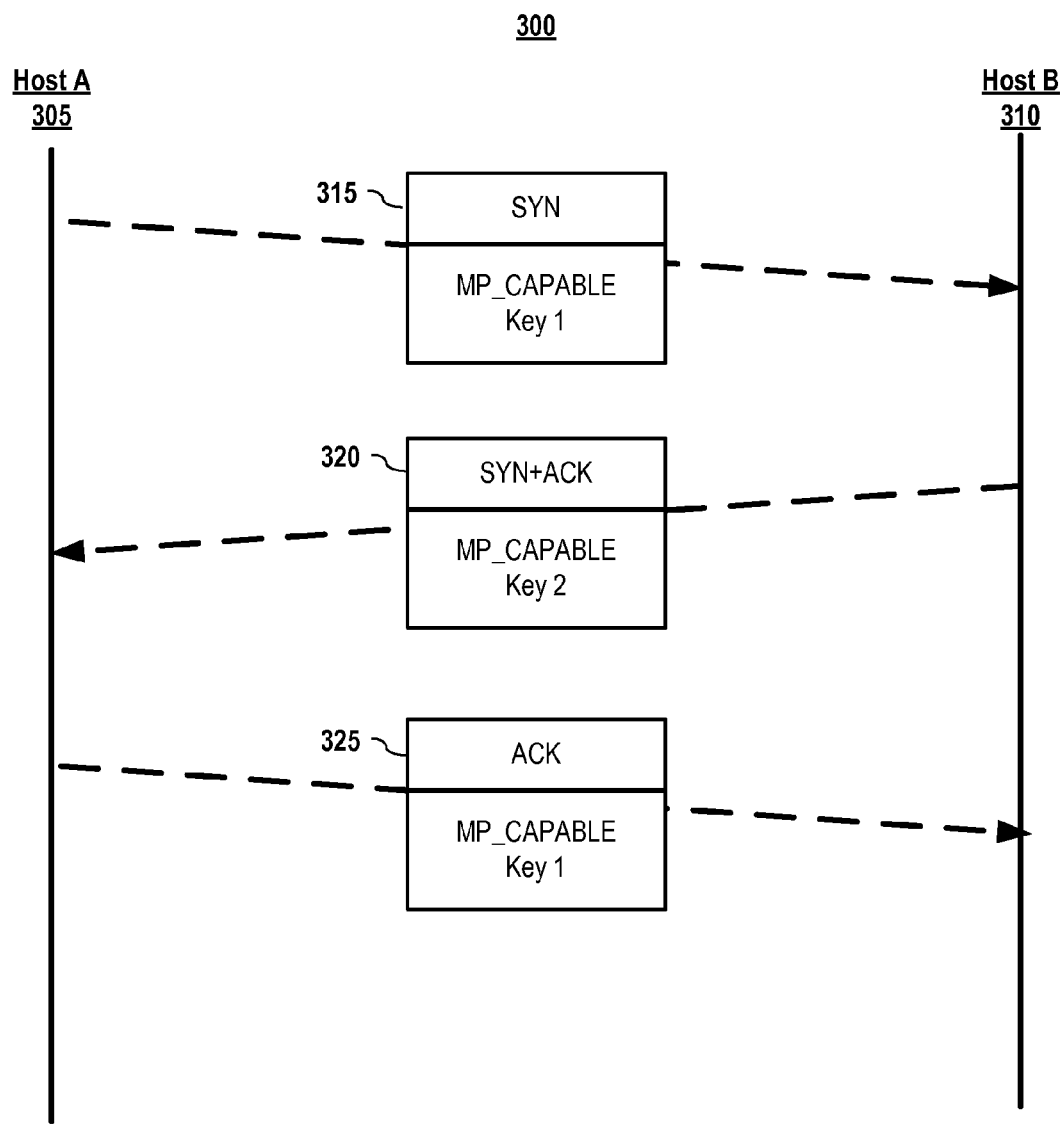
FIG. 3 depicts a handshake procedure for establishing a MPTCP connection.

FIG. 3 depicts the typical handshake process for establishing a MPTCP connection between hosts. An MPTCP connection is formed by using TCP options. The MP_CAPABLE option in a SYN segment (315) is sent from Host A 305 to Host B 310 to indicate that the Host A supports MPTCP. This packet also contains a random key (key 1) used for security purposes. If Host B 310 supports MPTCP, then it replies with a SYN+ACK segment 320 that also contains the MP_CAPABLE option. This packet contains a random key (key 2) chosen by Host B. Finally, a third ACK segment is sent that includes the MP_CAPABLE option to confirm establishment of MPTCP and the keys to enable stateless hosts.

Returning to FIG. 2, in embodiments, an information handling device, such as a Router A 202, examines incoming packets to identify if a MPTCP session is being established as part of a three-way handshake. For example, if a packet arrives that has the MP-CAPABLE option selected, which indicates that the source device of the SYN packet supports Multipath TCP, a copy of the SYN packet is sent (205) to the controller 204. Such a SYN packet will include a source key and source and destination information, such as the 4-tuple (e.g., source IP address, destination IP address, source port, and destination port). In embodiments, the controller receives this packet and enters (204) the MPTCP-related information (e.g., source key & 4-tuple) into a database or table. Given the source and destination information, the SDN controller will determine a route path and installs (215) the route path information in the appropriate devices (e.g., Router A (step 225) and Router B (Step 220)), as is normally done.

Router A receives (225) the route information and sends (230) the SYN packet with MP-CAPABLE option selected toward the destination host along the route path. This packet is received by a last-hop router of the SDN network (e.g., Router B), which forwards the packet to the destination host.

The destination host receives the packet and, if it is capable of supporting MPTCP, sends a SYN/ACK packet with MP-CAPABLE option selected (which includes its destination host key (e.g., key 2). In embodiments, an information handling device in the SDN network (e.g., Router B 206) receives the packet (240) and also examines the incoming packet to identify if a MPTCP session is being established as part of a three-way handshake. If the SYN/ACK packet has the MP-CAPABLE option selected, which indicates that the destination device supports Multipath TCP, a copy of the SYN/ACK packet is sent (245) to the controller 204. Such a SYN/ACK packet will include a destination key and source and destination information, such as the 4-tuple (e.g., source IP address, destination IP address, source port, and destination port). In embodiments, the controller receives this packet and enters (250) the MPTCP-related information (e.g., destination key & 4-tuple) into its database or table. Router B also sends the SYN/ACK packet toward the sender device along the installed route path. Although not shown in FIG. 2, the MPTCP handshake completes and an MPTCP connection is established for this flow, which may be referred to as the first or primary flow.

Given that the controller now has the information related to the primary flow, it can use this information to identify subflows. Once again, in embodiments, aspects of the present invention utilize knowledge of the MPTCP subflow handshake process.

Figure 5:
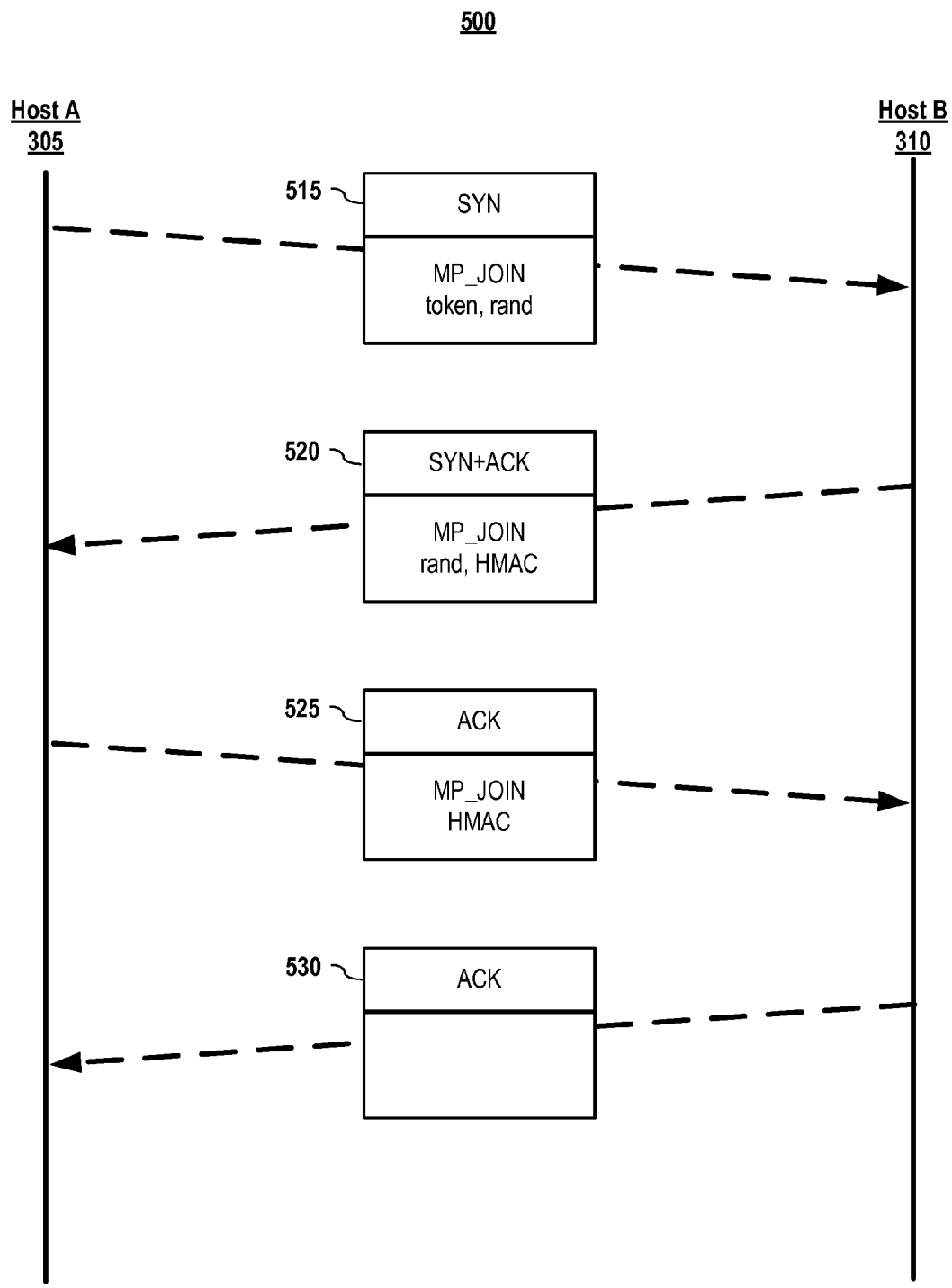
FIG. 5 depicts a handshake procedure for establishing a MPTCP subflow connection.

Because network address translation (NAT) may exist within a network system, the addresses and port numbers that are used may not be globally unique. However, to function properly, MPTCP needs to be able to link each subflow to an existing primary MPTCP connection. To accomplish this, MPTCP assigns a locally unique token to each connection. This token is exchanged during the subflow handshake process. FIG. 5 depicts a typical handshake process for establishing a MPTCP connection between hosts for a subflow.

As shown in FIG. 5, an MPTCP subflow connection is form by using TCP option of MP_JOIN. When a new subflow is added to an existing MPTCP connection, the MP_JOIN option of the SYN segment 515 sent from Host A 305 to Host B 310 contains a token of the associated MPTCP connection. MPTCP derives the token from a truncated hash of the key. Another function of the MP_JOIN option is to authenticate the addition of the subflow. To authenticate, Host A 305 and Host B 310 exchange a random nonce, and each host computes an HMAC (hash-based message authentication code) over the random nonce chosen by the other host and the keys exchanged during the initial handshake (e.g., 520 and 525). Now that the subflow has been established, the connection can be used to transmit data.

Figure 4:
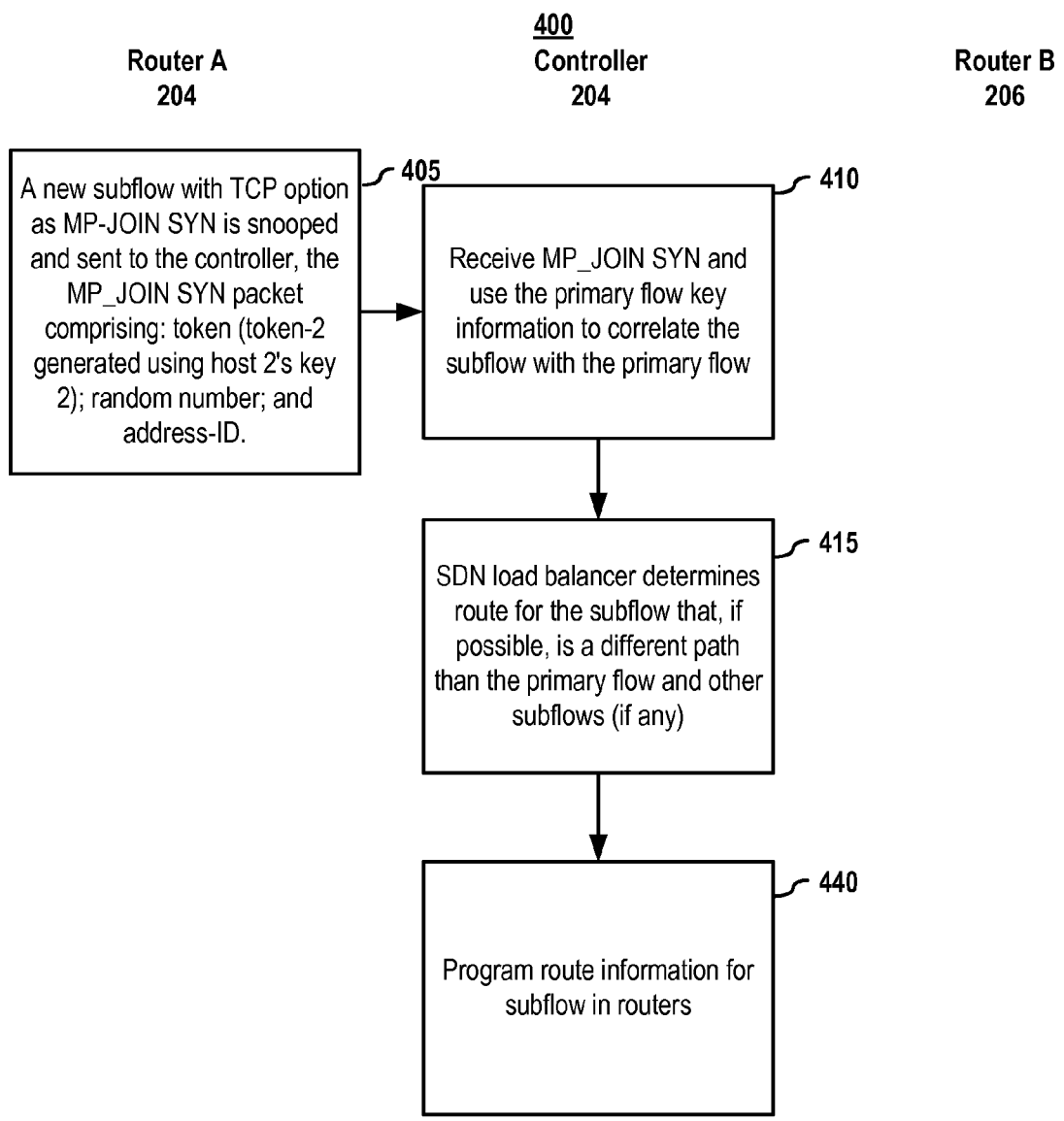
FIG. 4 depicts a methodology for load balancing routes for one or more subflows according to embodiments of the present invention.

FIG. 4 depicts a methodology for identifying and load balancing routes for one or more subflows according to embodiments of the present invention. Consider, for purposes of illustration, that a host, server-1, wants to communicate with another host, server-2, via MPTCP protocol. Server-1 initiates the primary flow, with MP-CAPABLE option selected and also includes locally generated key (Key-1). As discussed above with respect to FIG. 2, in embodiments, this SYN packet is snooped at the router and sent to an SDN controller, where a database is maintained for storing the keys and connection information such as 4-tuples.

Server-2 responds to this SYN packet with a SYN/ACK packet with MP-CAPABLE option. This packet includes a key generated by server-2 (Key-2), which is sent to server-1. As discussed in FIG. 2, in embodiments, the MP-CAPABLE SYN/ACK packet is also snooped and sent to the SDN controller. The controller, on receiving this information, updates its database with the server-2 key information. These two keys in the database can be used to associate the primary flow with one or more additional subflows, which may be created at a later point.

FIG. 6 depicts an example database or table that correlates flows with source and destination information and keys for a MPTCP flow according to embodiments of the present invention. Assume, for purpose of illustration, that the flow established above between server-1 and server-2 is Flow 1 in the table shown in FIG. 6. As can be seen in FIG. 6, Flow 1 is correlated with the snooped information, such as the source and destination information (e.g., 4-tuple flow 625), key-1 630, and key-2 635.

Returning to FIG. 4, server-1 initiates a new subflow with TCP option as MP-JOIN. In embodiments, this MP_JOIN SYN packet includes the following information: token (token-2 generated using server-2 key), random number and address-ID. Server-1 will send token-2, which is generated from key-2 received from server-2. This token is used by server-2 to identify the subflow and correlate it with the primary flow. In embodiments, this MP_JOIN packet is snooped (405) and sent to the SDN controller. Since the controller has already stored the primary flow key details (e.g., in the table in FIG. 6), it can receive the packet and is able to correlate (410) this subflow with the corresponding primary flow.

In embodiments, given this correlation between the flows, the SDN controller/load balancer may determine (415) a route for the subflow that, if possible, is a different route path than the primary flow and other subflows (if any). That is, in embodiments, with this information, the SDN load balancer can hash the subflow onto a different path other than the one used for the primary flow. In embodiment, this route information is installed (420) in the appropriate information handling devices.

Figure 7:
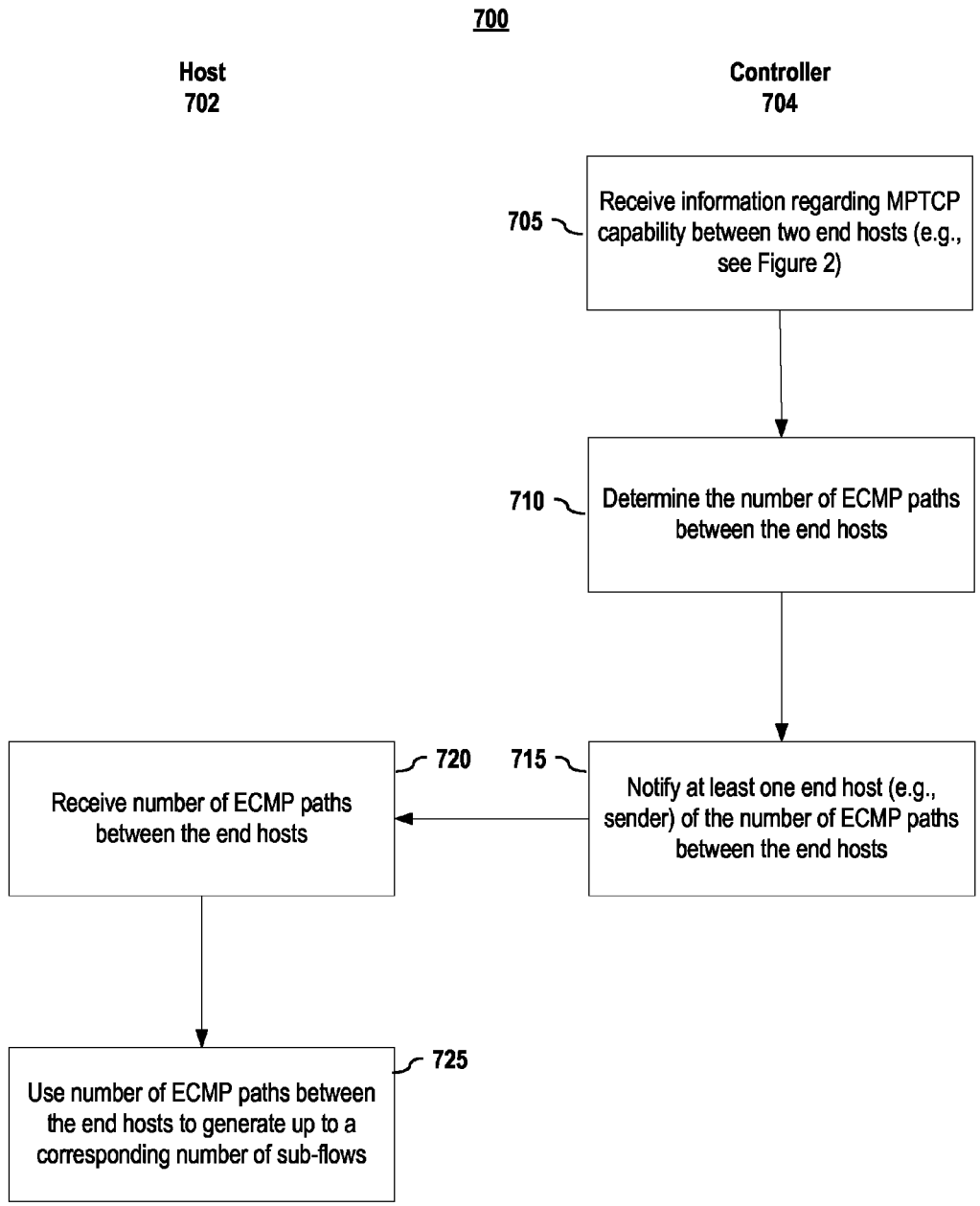
FIG. 7 depicts a methodology for allowing one or more host devices to receive information regarding the number of available route paths between hosts, which may be used by a host device when generating one or more subflows according to embodiments of the present invention.

In embodiments, to use ECMP paths efficiently between end-to-end hosts, the sending host, the destination host, or both may be made aware of the ECMP path count between the hosts. This information may be used by one or more of the hosts to create multiple subflows and to use the bandwidth more efficiently. FIG. 7 depicts a methodology for allowing one or more host devices to receive information regarding the number of available route paths between hosts, which may be used by a host device when generating one or more subflows according to embodiments of the present invention.

In embodiments, a controller receives (705) information regarding MPTCP capability between two end hosts (e.g., see FIG. 2). Knowing that the end hosts support MPTCP and given the source and destination information, in embodiments, a controller determines (710) the number of ECMP paths between the end hosts. The controller may then notify (715) at least one end host (e.g., the sender) of the number of ECMP paths between the end hosts. In embodiments, this communication between the controller and the end host(s) may occur via an existing protocol. For example, in embodiments, a new type of type-length-value (TLV) of a of Link Layer Discovery Protocol (LLDP) frame may be defined to communicate this information; or alternatively or additionally, a controller-to-host communication may be used to communicate this information to the host(s).

In embodiments, the end host or hosts receive (720) this information and may use the number of ECMP paths between the end hosts to generate up to a corresponding number of subflows.

C. System Embodiments

Figure 8:
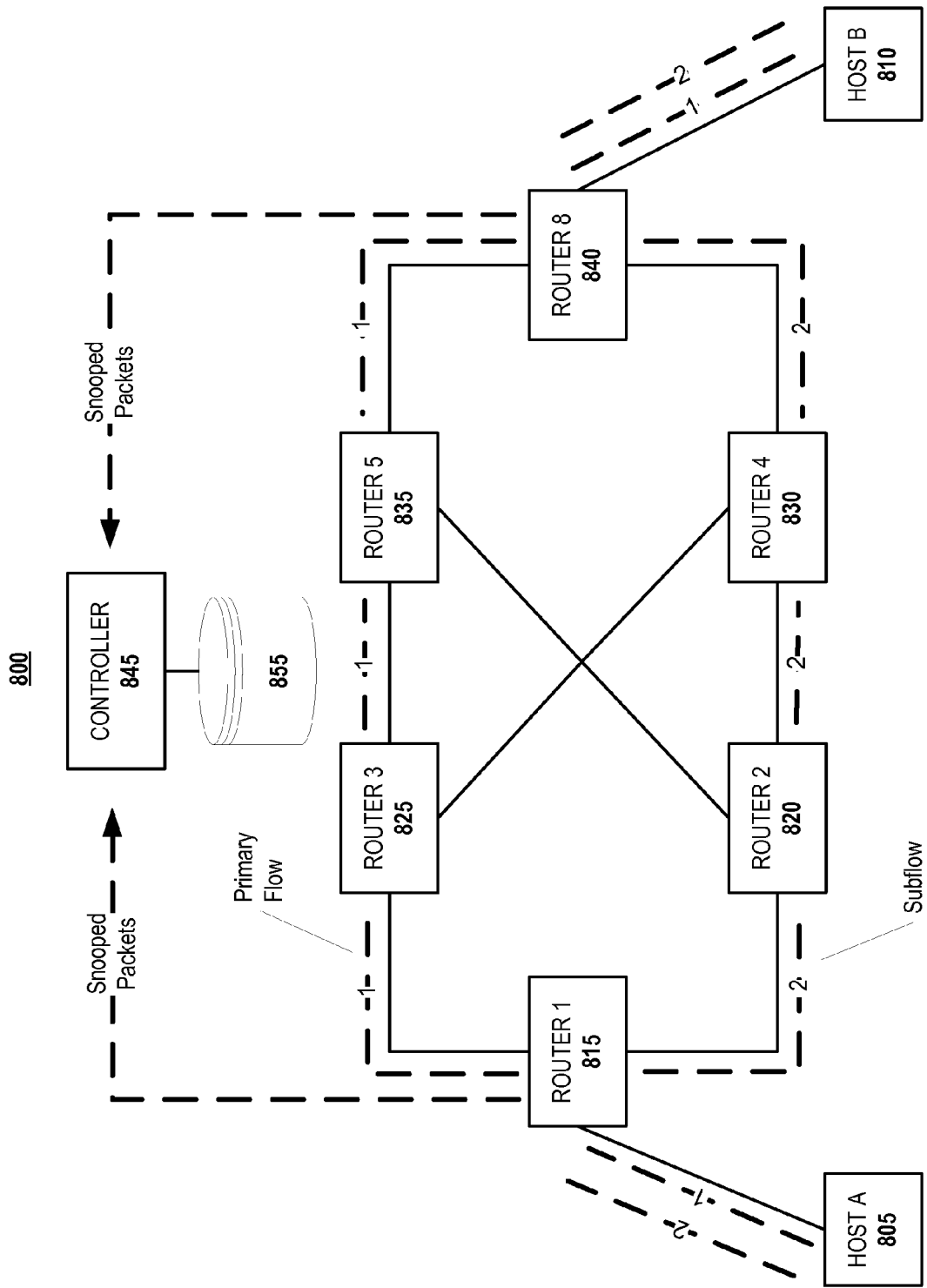
FIG. 8 depicts an example networking system and data flows according to embodiments of the present invention.

FIG. 8 depicts an example networking system and data flows according to embodiments of the present invention. In the depicted example, Host A 805 has initiated a primary flow (dashed flow 1) with a destination host, Host B 810 across a network system. In embodiments, as part of the formation of the MPTCP connection for the primary flow, packets were examined and copies sent to the controller 845 that generated a table that correlated the flow with the keys of the source (Host A) and the destination (Host B). For example, the initial SYN segment may be examined by Router 1 815 and a copy sent to the controller. And, the SYN+ACK segment that is sent in reply by Host B 810 may be examined by Router 8 840 and a copy sent to the controller 845. The controller, therefore, receives the source and destination information along with the keys for this flow and can associate all of this information in a table. In embodiments, the table may be stored in a memory, such as database 855, that is accessible by the controller 845.

When Host A attempts to establish a subflow with Host B, the MP_JOIN packet is snooped at Router 1 815. In embodiments, the controller can sequentially try the various keys to find the correct key for the token in the MP_JOIN packet. By identifying the correct key and using the flow association in the table (e.g., Table in FIG. 6), the controller can correlate this subflow with the correct primary flow. In embodiments, since the controller knows the router for the primary flow (dashed flow 1), the load balancer of the controller can select a route path (e.g., dashed flow 2) that is different from the primary flow.

Figure 9:
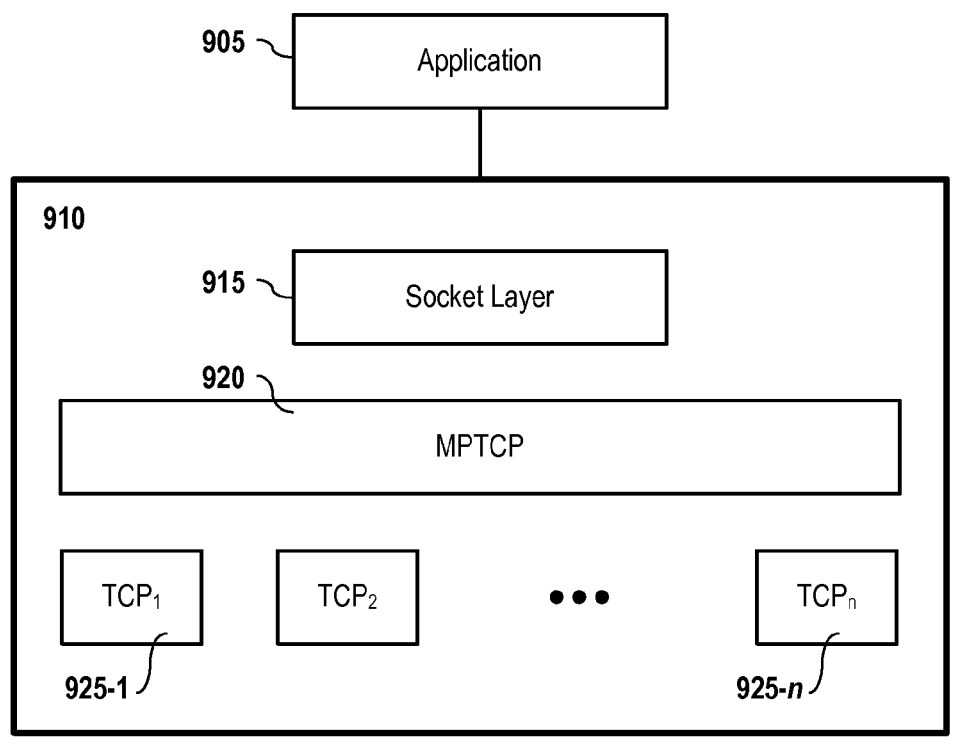
FIG. 9 shows a simplified block diagram of protocol stack according to embodiments of the present invention.

FIG. 9 shows a simplified block diagram of protocol stack according to embodiments of the present invention. In embodiments, an application 905 interacts through a regular socket application programming interface (API) 915 with the transport layer 910, and MPTCP 920 manages the underlying TCP connections 925-*x* that are used to carry data. MPTCP acts as a shim layer between the socket interface 915 and one or more TCP subflows, as shown in FIG. 9.

In embodiments, host systems may operate as normal but still get the benefits of the better path utilization. Alternatively, host systems may be configured to receive the number of ECMP paths between two hosts and may use this information when generating subflows (e.g., 925-*x*).

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 10:
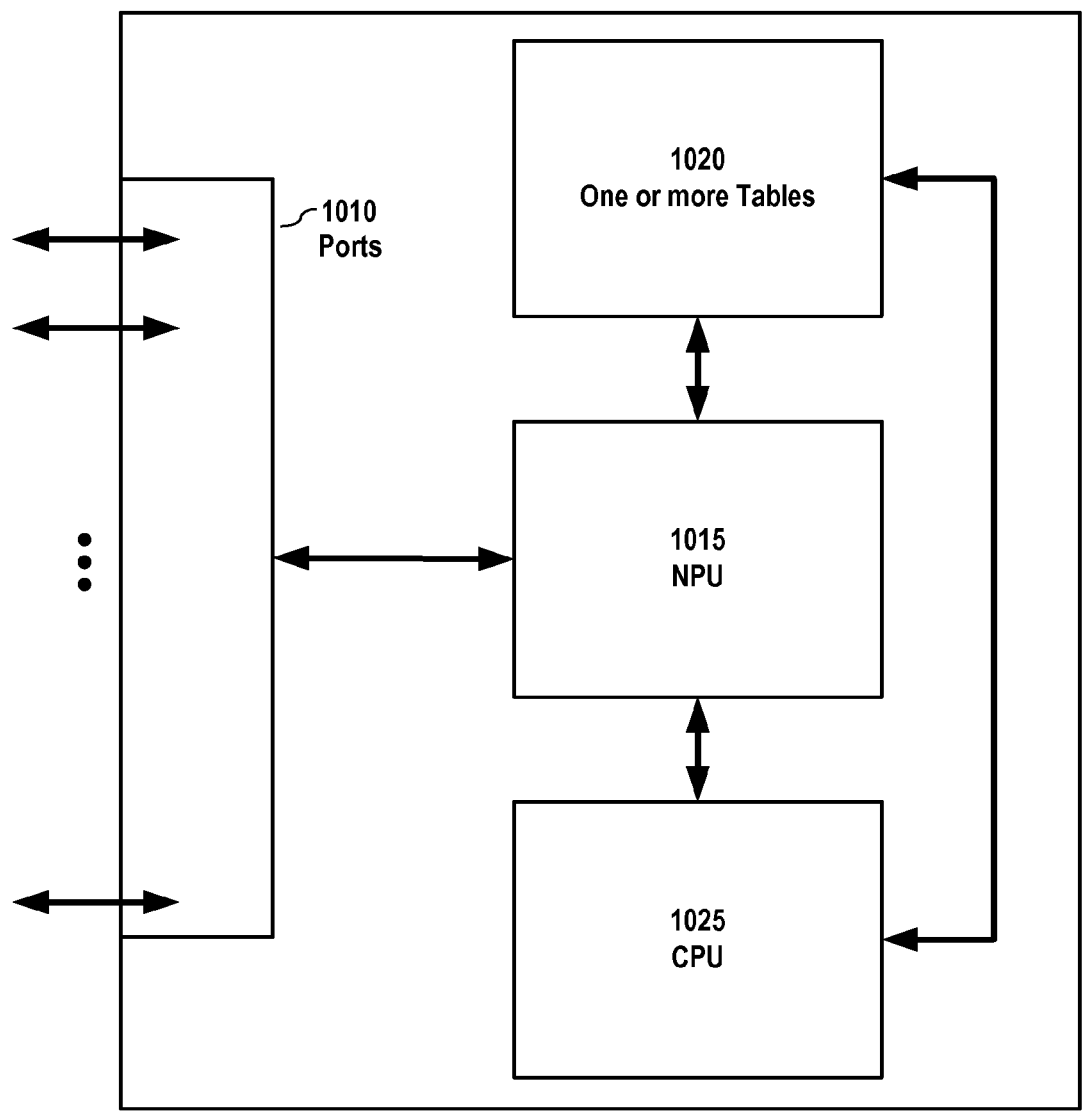
FIG. 10 shows a simplified block diagram of an information handling system according to embodiments of the present invention.

FIG. 10 depicts a simplified block diagram of an information handling system 1000 according to embodiments of the present invention. It will be understood that the functionalities shown for device 1000 may operate to support various embodiments of an information handling system (or node)—although it shall be understood that an information handling system may be differently configured and include different components. The information handling system 1000 may include a plurality of I/O ports 1010, a network processing unit (NPU) 1015, one or more tables 1020, and a central processing unit (CPU) 1025. The system includes a power supply (not shown) and may also include other components, which are not shown for sake of simplicity.

In embodiments, the I/O ports 1010 may be connected via one or more cables to one or more other network devices or clients. The network processing unit (NPU) 1015 may use information included in the network data received at the node 1000, as well as information stored in the tables 1020, to identify a next hop for the network data, among other possible activities. In embodiments, a switching fabric then schedules the network data for propagation through the node to an egress port for transmission to the next hop.

In embodiments, information handling devices may be configured inspect incoming packets, particularly the first-hop routers, to look for MPTCP handshake packets and send a copy of these packets to the controller.

In embodiments, a controller may be a computing device or may be a information handling devices may be configured inspect incoming packets, particularly the first-hop routers, to look for MPTCP handshake packets and send a copy of these packets to the controller.

Figure 11:
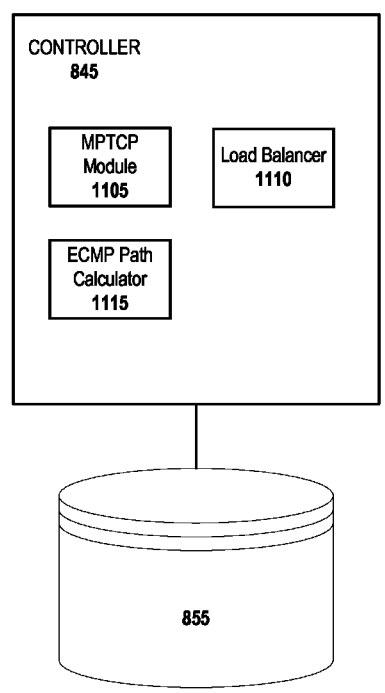
FIG. 11 shows a controller according to embodiments of the present invention.

FIG. 11 shows a controller according to embodiments of the present invention. In embodiments, a controller may comprise a MPTCP module 1105, a load balancer 1110, and an ECMP path calculator 1115. In embodiments, the controller may be a computing device, including but not limited to a server or an information handling device.

In embodiments, the MPTCP module 1105 receives snooped packets. In embodiments, the MPTCP 1105 receives the extracted source and destination information for the flow and keys and stores the data in a table. In embodiments, the table may be stored in a database or memory within the controller; alternatively, in embodiments, the controller may include or may be communicatively connected to a database 885 for storing the table data.

In embodiments, the MPTCP module also uses the table data to correlate a snooped MP_JOIN packet subflow with a primary flow. Once correlated, a load balancer (e.g., load balancer 1110) can use this information when determining a route path.

In embodiments, the load balancer 1110 functions as a typical load balancer; however, in addition, when a subflow is detected, the load balancer will try to route the subflow onto a route that is different from the primary flow and any other additional subflows, if possible.

In embodiments, the controller may include an ECMP path calculator 1115 that determines, for a primary flow, the number of paths between a source and destination. The controller may then inform the source host or the source and destination hosts about the number of paths. With this information, one or more of the hosts may use this information when generating subflows.

It shall be noted that aspects of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

One skilled in the art will recognize no particular computing system or programming language is critical to the practice of the present invention. One skilled in the art will also recognize that a number of the elements described above may be physically and/or functionally separated into sub-modules or combined together.

D. Use Case Example

As previously noted, ECMP does not differentiate between elephant and mice flows, creates head-of-line blocking for mice flows in the egress port buffer, and results in long tail latency. Furthermore, it does not fully utilize available bandwidth due to hash collision among elephant flows. When TinyFlows are created by breaking elephants (i.e., large flows) into mice (i.e., small flows) and send across the MP-TCP session, the bandwidth can be used more efficiently and also it prevents the mice flows from being blocked by an elephant flow.

Figure 12:
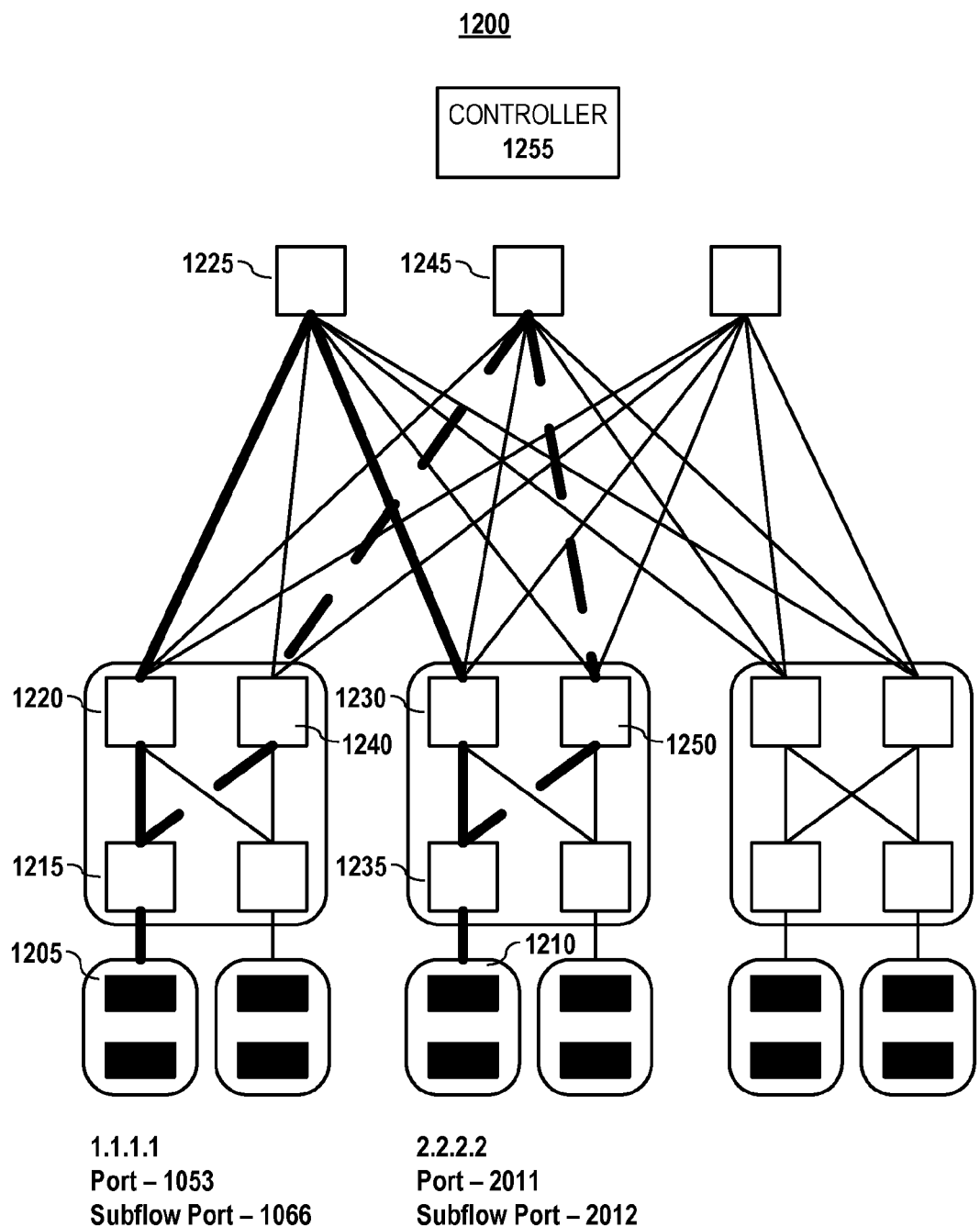
FIG. 12 depicts a sample use case according to embodiments of the present invention.

FIG. 12 depicts a sample use case according to embodiments of the present invention. Depicted in FIG. 12 is a data center architecture 1200 that includes a controller 1255, a set of routing devices (e.g., 1225 and 1245) of a data center.

As shown in FIG. 12, an application in server (1.1.1.1) wants to send data to another server, server (2.2.2.2). The initial primary flow will contain a source IP address as 1.1.1.1, a source port as 1053, a destination IP address as 2.2.2.2, and a destination port as 2011. Assume for purposes of illustration that this primary flow is routed from the server (1.1.1.1)→1205→1215→1220→1225→1230→1235→ 1210 server 2.2.2.2.

In order to efficiently use another link, the server (1.1.1.1) creates a subflow, whose source IP address is 1.1.1.1 and source port is 1066 and the destination IP address is 2.2.2.2 and destination port is 2012. Note that the IP address in this case remains the same, whereas the destination port and source port are different from that of a primary flow. But when this subflow reaches the networking node, it cannot be guaranteed that this subflow will take an alternate path to reach the destination. If the networking device chooses the same path for subflow that the primary flow had taken, then the MPTCP capability are not being adequately utilized.

Accordingly, in embodiments, using the systems and methods disclosed herein, the subflow may be programmed at the top-of-rack (TOR) switch to effective utilize the alternate bandwidth. Because the controller/load balancer 1255 can discover the flows, it can treat the subflow as a different flow and can identify its relationship with the primary flow. This information is then used as criteria when installing the route path for the flows. Thus, for purposes of illustration, the subflow can be routed on a different path, namely from the server (1.1.1.1)→1205→1215→1240→ 1245→1250→1235→1210 server 2.2.2.2.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for identifying a Multipath Transmission Control Protocol (MPTCP) subflow for improved multipath bandwidth usage comprising:

receiving at a controller information handling system a copy of a synchronize (SYN) packet with a MP-CAPABLE option selected, which indicates that a source device of the SYN packet supports Multipath TCP, the SYN packet comprising a first key and a first set of source and destination information associated with a first flow;

storing the first key and the first set of source and destination information in a database that associates the first key and the first set of source and destination information with the first flow;

receiving at the controller information handling system a copy of a synchronize-acknowledgement (SYN+ACK) packet with a MP-CAPABLE option selected, which indicates that a destination device of the SYN packet supports Multipath TCP, the SYN+ACK packet comprising a second key associated with the first flow;

storing the second key in the database that associates the second key with the first flow;

receiving at the controller information handling system a copy of a packet representing initiation of a subflow between the source device and the destination device, the packet comprising a token generated using the second key; and responsive to identifying the packet as being a subflow of the first flow by using a correlation of the destination key with the first flow in the database, assigning a new route for the new subflow that is different from a route for the first flow.

2. The method of claim 1 wherein the method is performed at a controller information handling system.

3. The method of claim 1 wherein the step of assigning of the new route for the new subflow comprises:

using a load balancer to determine the new route.

4. The method of claim 3 wherein the assigning of the new route for the new subflow does not depend upon an Equal Cost Multipath hashing.

5. The method of claim 1 further comprising the step of:

installing route path information for the new route into at least some of a set of information handling devices along the new route between the source device and the destination device.

6. The method of claim 1 further comprising the steps of:

using a set of source and destination information associated with a flow to calculate a number of routes between the source device and the destination device; and sending a notification to the source device regarding the number of routes for the source device to consider when generating one or more subflows.

7. A method for identifying a Multipath Transmission Control Protocol (MPTCP) subflow for improved multipath bandwidth usage comprising:

generating a database that correlates, for a primary flow between a source device and a destination device, a source key from the source device and a destination key from the destination device;

receiving at a controller information handling system a copy of a packet representing initiation of a new subflow between the source device and the destination device, the packet comprising a token generated using the destination key; and responsive to identifying the packet as being a subflow of the primary flow by using a correlation of the destination key with the primary flow in the database, assigning a new route for the new subflow that is different from a route for the primary flow.

8. The method of claim 7 wherein the step of assigning of the new route for the new subflow comprises:

using a load balancer to determine the new route.

9. The method of claim 8 wherein the assigning of the new route for the new subflow does not depend upon an Equal Cost Multipath hashing.

10. The method of claim 7 further comprising the step of:

installing route path information for the new route into at least some of a set of information handling devices along the new route between the source device and the destination device.

11. The method of claim 7 wherein the step of generating a database that correlates, for a primary flow between a source device and a destination device, a source key from the source device and a destination key from the destination device comprises:

receiving copies of packets in a MPTCP handshake between the source device and the destination that comprise the source key and a first set of source and destination information associated with the primary flow and the destination key associated with the primary flow; and storing the first set of source and destination information, the source key, and the destination key in the database that associates the source key and destination key with the primary flow.

12. The method of claim 11 wherein the step of receiving copies of packets in a MPTCP handshake between the source device and the destination that comprise the source key and a first set of source and destination information associated with the primary flow and the destination key associated with the primary flow comprises:

receiving from a first information handling system a copy of a synchronize (SYN) packet with a MP-CAPABLE option selected, which indicates that the source device of the SYN packet supports Multipath TCP, the SYN packet comprising the source key and the first set of source and destination information associated with the primary flow; and receiving from a second information handling system a copy of a synchronize-acknowledgement (SYN+ACK) packet with a MP-CAPABLE option selected, which indicates that the destination device supports Multipath TCP, the SYN+ACK packet comprising a destination key associated with the primary flow.

13. The method of claim 12 wherein the first information handling system is a first hop routing device for the source device and the second information handling system is a first hop routing device for the destination device.

14. The method of claim 7 wherein the information handling system is a first hop routing device for the subflow.

15. The method of claim 7 further comprising the steps of:

using a set of source and destination information associated with a flow to calculate a number of routes between the source device and the destination device; and sending a notification to the source device regarding the number of routes for the source device to consider when generating one or more subflows.

16. A controller for improving bandwidth usage for flows using Multipath Transmission Control Protocol (MPTCP) for a flow of data through a network comprising a plurality of information handling systems, the controller comprising:

a plurality of ports for facilitating communications with one or more of the plurality of information handling systems communicatively coupled to the controller;

one or more processors that are communicatively coupled to the plurality of ports; and a non-transitory memory comprising one or more sequences of instructions which, when executed by the at least one of the one or more processors, causes steps to be performed comprising:

generating a database that correlates, for a primary flow between a source device and a destination device, a source key from the source device and a destination key from the destination device;

receiving from an information handling system a packet representing initiation of a new subflow between the source device and the destination device, the packet comprising a token generated using the destination key; and responsive to identifying the packet as being a subflow of the primary flow by using the correlation of the destination key with the primary flow in the database, assigning a new route for the new subflow that is different from a route for the primary flow.

17. The controller of claim 16 wherein the non-transitory memory further comprises one or more sequences of instructions which, when executed by at least one of the one or more processors, causes steps to be performed comprising:

installing route path information for the new route into at least some of a set of information handling devices along the new route between the source device and the destination device.

18. The controller of claim 16 wherein the step of generating a database that correlates, for a primary flow between a source device and a destination device, a source key from the source device and a destination key from the destination device comprises:

receiving copies of packets in a MPTCP handshake between the source device and the destination that comprise the source key and a first set of source and destination information associated with the primary flow and the destination key associated with the primary flow; and storing the first set of source and destination information, the source key, and the destination key in the database that associates the source key and destination key with the primary flow.

19. The controller of claim 18 wherein the step of receiving copies of packets in a MPTCP handshake between the source device and the destination that comprise the source key and a first set of source and destination information associated with the primary flow and the destination key associated with the primary flow comprises:

receiving from a first information handling system a synchronize (SYN) packet with a MP-CAPABLE option selected, which indicates that the source device of the SYN packet supports Multipath TCP, the SYN packet comprising the source key and the first set of source and destination information associated with the primary flow; and receiving from a second information handling system a synchronize-acknowledgement (SYN+ACK) packet with a MP-CAPABLE option selected, which indicates that the destination device supports Multipath TCP, the SYN+ACK packet comprising a destination key associated with the primary flow.

20. The controller of claim 17 wherein the non-transitory memory further comprises one or more sequences of instructions which, when executed by at least one of the one or more processors, causes steps to be performed comprising:

using a set of source and destination information associated with a flow to calculate a number of routes between the source device and the destination device; and sending a notification to the source device regarding the number of routes for the source device to consider when generating one or more subflows.

* * * * *